United States Patent
Ko et al.

(10) Patent No.: US 10,476,605 B2
(45) Date of Patent: Nov. 12, 2019

(54) UNDERWATER COMMUNICATION METHOD

(71) Applicant: Hoseo University Academic Cooperation Foundation, Chungcheongnam-do (KR)

(72) Inventors: Hak-Lim Ko, Chungcheongnam-do (KR); Yong-Kap Cho, Gyeonggi-do (KR); Tae-Ho Im, Chungcheongnam-do (KR)

( * ) Notice: Subject to any disclaimer, the term of this patent is extended or adjusted under 35 U.S.C. 154(b) by 0 days.

(21) Appl. No.: 16/065,425

(22) PCT Filed: Nov. 8, 2016

(86) PCT No.: PCT/KR2016/012767
§ 371 (c)(1),
(2) Date: Jun. 22, 2018

(87) PCT Pub. No.: WO2017/115998
PCT Pub. Date: Jul. 6, 2017

(65) Prior Publication Data
US 2019/0007146 A1    Jan. 3, 2019

(30) Foreign Application Priority Data

Dec. 28, 2015   (KR) .......................... 10-2015-0187193

(51) Int. Cl.
*H04B 13/02*  (2006.01)
*H04W 72/04*  (2009.01)

(52) U.S. Cl.
CPC .......... *H04B 13/02* (2013.01); *H04W 72/048* (2013.01); *H04W 72/0453* (2013.01)

(58) Field of Classification Search
CPC .......... H04B 13/02; H04B 11/00; H04B 7/26; H04W 72/048; H04W 84/18; H04W 72/0453
USPC .......................................................... 455/40
See application file for complete search history.

(56) References Cited

U.S. PATENT DOCUMENTS 9,668,274 B1 *   5/2017   Bartlett ............. H04W 72/1231
2016/0124105 A1 *   5/2016   Valsvik ................ G01V 1/3852
                                                                      367/15

* cited by examiner

*Primary Examiner* — Eugene Yun
(74) *Attorney, Agent, or Firm* — Baker Donelson (57) ABSTRACT

The present invention provides an underwater communication system capable of efficiently communicating with a plurality of sensor nodes by using a limited frequency in the water. The present invention has a hierarchical structure in which one underwater base station control station manages a plurality of underwater base stations in the water, and each underwater base station within a plurality of underwater base stations centrally manages a plurality of underwater sensor nodes. Furthermore, the present invention enables efficient underwater communication the underwater environment by using different frequencies, when the underwater base station control station performs the underwater communication with the plurality of underwater base stations, and when the underwater base stations perform the underwater communication with the plurality of underwater sensor nodes.

14 Claims, 6 Drawing Sheets

UNDERWATER COMMUNICATION METHOD

CROSS-REFERENCE TO RELATED APPLICATIONS

The present application is a national entry of PCT/KR2016/012767 filed Nov. 8, 2016, which derives priority from Korea Application Serial No. 10-2015-0187193 filed Dec. 28, 2015.

FIELD OF THE INVENTION

The teachings in accordance with exemplary and non-limiting embodiments of this invention relate generally to an underwater communication system, and more particularly to an underwater communication system in hierarchical structure of centralized management.

DESCRIPTION OF THE BACKGROUND

Concomitant with increased interest and importance in marine resources exploration, marine environmental surveillance and underwater military defenses, demand on underwater communication capable of collecting multifarious underwater information from oceans has recently increased. The underwater communication is performed using ultrasonic waves because of physical properties of media. A communication network for underwater information transmission may be implemented by installing a sensor node capable of performing transmission/reception of underwater information under underwater environments, and by obtaining and controlling underwater information from the sensor node.

Because of underwater communication environments using ultrasonic waves, the underwater communication network is relatively smaller in bandwidth of signal that is transmitted than the land communication, and signal attenuation relative to distance is also very large. That is, frequencies used in underwater communication network have to be very limited in order to perform a reliable communication at a distance of several kilo meters to several scores of kilo meters.

Moreover, when the demand on underwater information obtainment using underwater communication network increases, the number of sensor nodes performing communication in the underwater also increases. However, the conventional underwater communication network failed to efficiently control the sensor nodes due to limitation of frequencies useable at the underwater channel environments. That is, when only one frequency is used to perform the communication in the conventional underwater communication network, and when a relevant frequency is allocated to one sensor node, all other sensor nodes cannot transmit or receive a signal.

Furthermore, when communication is performed using a plurality of frequencies in the conventional underwater communication network, and when the number of sensor nodes wanting to perform a communication in the water is greater than the allocated frequency, the underwater sensor nodes as many as the number exceeding the allocated frequency cannot transmit or receive a signal. In addition, in this case, all sensor nodes must continuously inspect what frequency an ambient sensor node uses by being allocated, such that battery consumption greatly increases in the water to greatly decrease an operation period of underwater sensor node.

Thus, the conventional underwater communication network has limited the number of communicable sensor nodes because a plurality of sensor nodes cannot be efficiently managed. On top of that, it has become inevitable to increase the number of sensor nodes due to increases in various demands on marine information, and therefore, the trend is that an efficient control of underwater communication network in various areas is greatly required.

SUMMARY OF THE INVENTION

A technical subject to be solved by the present invention is to provide an underwater communication system configured to efficiently implement communication with a multifarious number of sensor nodes using limited frequency in the water.

Another technical subject to be solved by the present invention is to provide an underwater communication system of hierarchical structure in which one underwater base station control station manages a plurality of underwater base stations in a centralized management way, and each underwater base station manages a plurality of underwater sensor nodes in a centralized management way.

In one general aspect of the present invention, there is provided an underwater communication system, the system comprising:

a plurality of sensor nodes installed in an underwater environment;

a plurality of underwater base stations centrally managing the plurality of sensor nodes in order to aggregate underwater information detected by the plurality of sensor nodes; and an underwater base station controller centrally managing the plurality of underwater base stations installed in the underwater environment, wherein the underwater base station estimates a distance between the underwater base station and the under water sensor node, and controls a particular frequency band selection to be allocated an arbitrary sensor node in response to the estimated distance.

Preferably, but not necessarily, the plurality of underwater base stations may manage each different plurality of sensor nodes.

Preferably, but not necessarily, a first frequency area for underwater communication between the underwater base station and underwater base station controller, and a second frequency area for underwater communication between the underwater base station and the underwater sensor node may be set and used as different frequency bands, wherein the first frequency area may be divided to a first frequency hand used when a signal is transmitted from the underwater base station con roller to the underwater base station, and a second frequency band used when a signal is transmitted from the underwater base station to the underwater base station controller.

Preferably, but not necessarily, the first frequency hand may include a lowest frequency in all operable frequency bands included in the first frequency area and the second frequency area.

Preferably, but not necessarily, the second frequency band may be divided to narrow band frequencies as many as the number of underwater base stations, and different frequency may be allocated to each underwater base station.

Preferably, but not necessarily, the second frequency area may be divided to a third frequency band used when a signal is transmitted from the underwater base station to the underwater sensor node, and a fourth frequency band used when a signal is transmitted from the underwater sensor node to the underwater base station.

Preferably, but not necessarily, the third frequency band may include a lowest frequency in an operational frequency included in the second frequency area.

Preferably, but not necessarily, the fourth frequency band may be divided to a narrowband frequency as many as the number of underwater sensor nodes under management of the underwater base station, and may be allocated with another frequency to each underwater sensor node.

Preferably, but not necessarily, the underwater base station controller may estimate a distance between the underwater base controller and the underwater base station, and may control a particular frequency band selection to be allocated to an arbitrary underwater base station in response to an estimated distance value.

Preferably, but not necessarily, each of the plurality of underwater base stations may include a management control part for managing an operational frequency of underwater sensor node, a controller for controlling an entire underwater base station, a communication controller for communication between the underwater sensor node and the under rater base station controller, and a memory for storing data necessary for frequency management of the underwater sensor node, wherein the underwater base station controller may include a management control part for managing operational frequency of the plurality of underwater base stations, a controller for controlling an entire underwater base station controller, a communication controller for communication between the plurality of underwater base stations, and a memory for storing data necessary for frequency management of the underwater base station, and wherein the frequency management of the first frequency area may be realized under management of the underwater base station controller, and the frequency management of the second frequency area may be realized by management of the plurality of underwater base stations.

The underwater communication system according to the present invention is characterized by the fact that a plurality of underwater sensor nodes is centrally managed by an underwater base station in an underwater environment, and a plurality of underwater base stations is centrally managed by an underwater base station controller. Furthermore, the present invention is characterized by the fact that an underwater communication between the underwater sensor node and the underwater base station, and an underwater communication between underwater base station controller and the underwater base station is implemented by using each different frequency.

In addition, the underwater communication system according to the present invention is characterized by the fact that a distance between the underwater base station and the underwater sensor node is estimated, and selection of a particular frequency band to be allocated to an arbitrary sensor node is controlled in response to an estimated distance value.

The present invention according to the abovementioned characteristics has an advantageous effect in that a plurality of underwater sensor nodes and a plurality of underwater base stations can be efficiently controlled by using different frequencies. Furthermore, satisfaction can be enhanced because a more number of underwater sensor nodes are used in obtaining underwater information.

DETAILED DESCRIPTION OF THE PREFERRED EMBODIMENTS

Exemplary embodiments of the present invention disclosed in the specification will be described in detail with the accompanying drawings, where throughout the descriptions, the same reference numerals will be assigned to the same elements in the explanations of the figures, and overlapping explanation thereto will be omitted.

The suffixes 'station', 'part' and 'node' may be used for elements in order to facilitate the easy writing of specification. Significant meanings or roles may not be given to the suffixes themselves.

In describing the present invention, detailed descriptions of well-known art in the art may be omitted to avoid obscuring appreciation of the invention by a person of ordinary skill in the art with unnecessary details. Furthermore, the accompany drawings are merely provided to facilitate easy understanding of exemplary embodiments disclosed in the present specification, and technical ideas disclosed in the specification are not limited by the accompany drawings, and it will be appreciated that the described aspect is intended to embrace all such alterations, modifications, and variations that fall within the scope and novel idea of the present disclosure.

It will be understood that, although the terms first, second, etc. may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms "a," "an" and "the" are intended to include the plural forms as well, unless the context clearly indicates otherwise. It will be further understood that the terms "comprises", "includes" and or "comprising," "including" when used in this specification, specify the presence of stated features, integers, Steps, operations, elements, and/or components, but do not preclude the presence or addition of one or more other features, integers, Steps, operations, elements, components, and/or groups thereof.

Hereinafter, exemplary embodiments of the present invention will be described in detail with reference to the accompanying drawings. It will be appreciated to the skilled in the art that the present invention will be embodied in other particular forms unless deviated from the spirit and essential features of the present invention.

Figure 1:
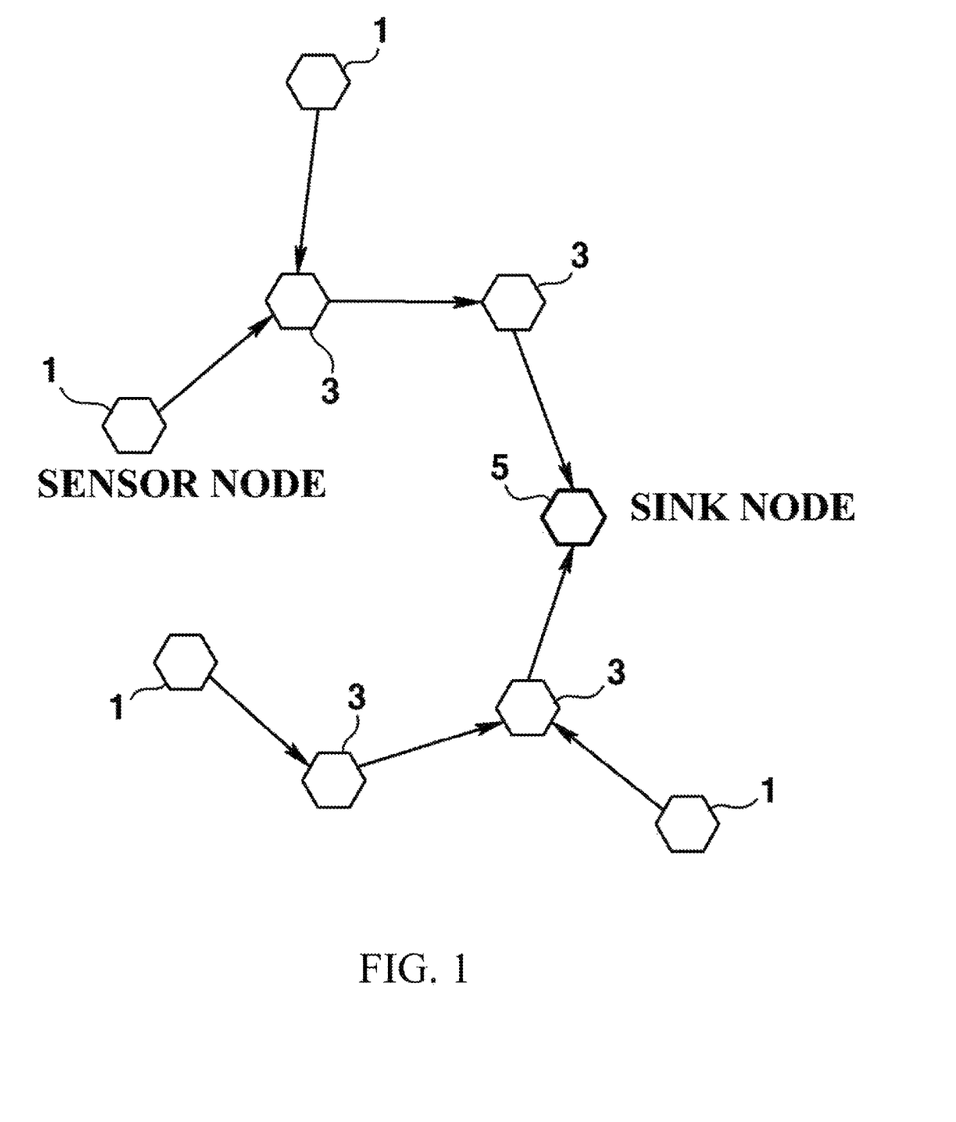
FIG. 1 is a schematic view illustrating a conventional underwater communication network used for an underwater communication in order to help understand the present invention.

FIG. 1 is a schematic view illustrating a conventional underwater communication network used to an underwater communication that is illustrated in order to help understand the present invention.

The underwater communication network illustrated in FIG. 1 may be formed by including a plurality of sensor nodes (1), a sink node (5), and an intermediate note (3) performing an information transfer role between the sensor nodes (1) and the sink node (5).

The transmission of underwater information in the underwater communication network thus configured may be realized in the following manner.

The underwater information detected from the plurality of sensor nodes (1) is transmitted to the sink node (5) through the intermediate node (3) formed by the sensor nodes (1) with several steps. However, the underwater communication network thus configured must go through several steps of intermediate node (3) in transmitting the underwater information detected from the sensor node (1) to the sink node (5). Thus, routing algorithm for transmitting the detected underwater information in the underwater communication network connected from the sensor node (1), the intermediate node (3) of several steps and sink node is realized in a complex manner.

Furthermore, when an error is generated in the process of transmitting the underwater information from the sensor node (1) to the sink node (5) in the underwater communication network, a process of re-transmitting the detected underwater information can be cumbersome. In addition, because the underwater communication network must pass through several steps of intermediate node (3), and therefore, when there is generated a problem in the intermediate node that transmits the underwater information, a sensor node related to the intermediate node that is generated with the problem cannot be used.

That is, the underwater communication network illustrated in FIG. 1 is a communication network of AD-HOC based sensor network structure where underwater information is transmitted to an underwater sink node after communication between a plurality of underwater sensor nodes and intermediate node is implemented. This type of control structure is devoid of a central node adjusting a network between sensor nodes, such that sensor nodes must form a network using sensor nodes-owned information and make a routing table. If it is desired to communicate with a remote-distanced AD-HOC network, the communication must be made through other sensor nodes to generate a delay caused by setting of routing routes, and to decrease transmission efficiency because a plurality of underwater sensor nodes must share the same frequency.

Moreover, lots of cases of communication-unstable routing routes may be generated by special underwater environments even after setting of routing routes, thereby resulting in a fact of very poor physical link quality. Because of these and other problems, the conventional underwater communication network illustrated in FIG. 1 has to suffer from disadvantages of decreased efficiency in usage of equipment including data transmission efficiency in the processes of obtaining and transmitting various types of underwater information.

In order to improve these problems, the present invention is intended to embody an underwater communication system of hierarchical underwater communication structure while centrally managing a plurality of underwater sensor nodes.

Hereinafter, as used in the explanation of the present invention, the "frequency band" and the "frequency" may be interchangeably used. The "frequency" may be called a frequency included in the "frequency band", where, the two terms of "frequency band" and "frequency" may be expressed with a same meaning, because frequencies in a predetermined scope thereof are carried with an almost same signal.

Figure 2:
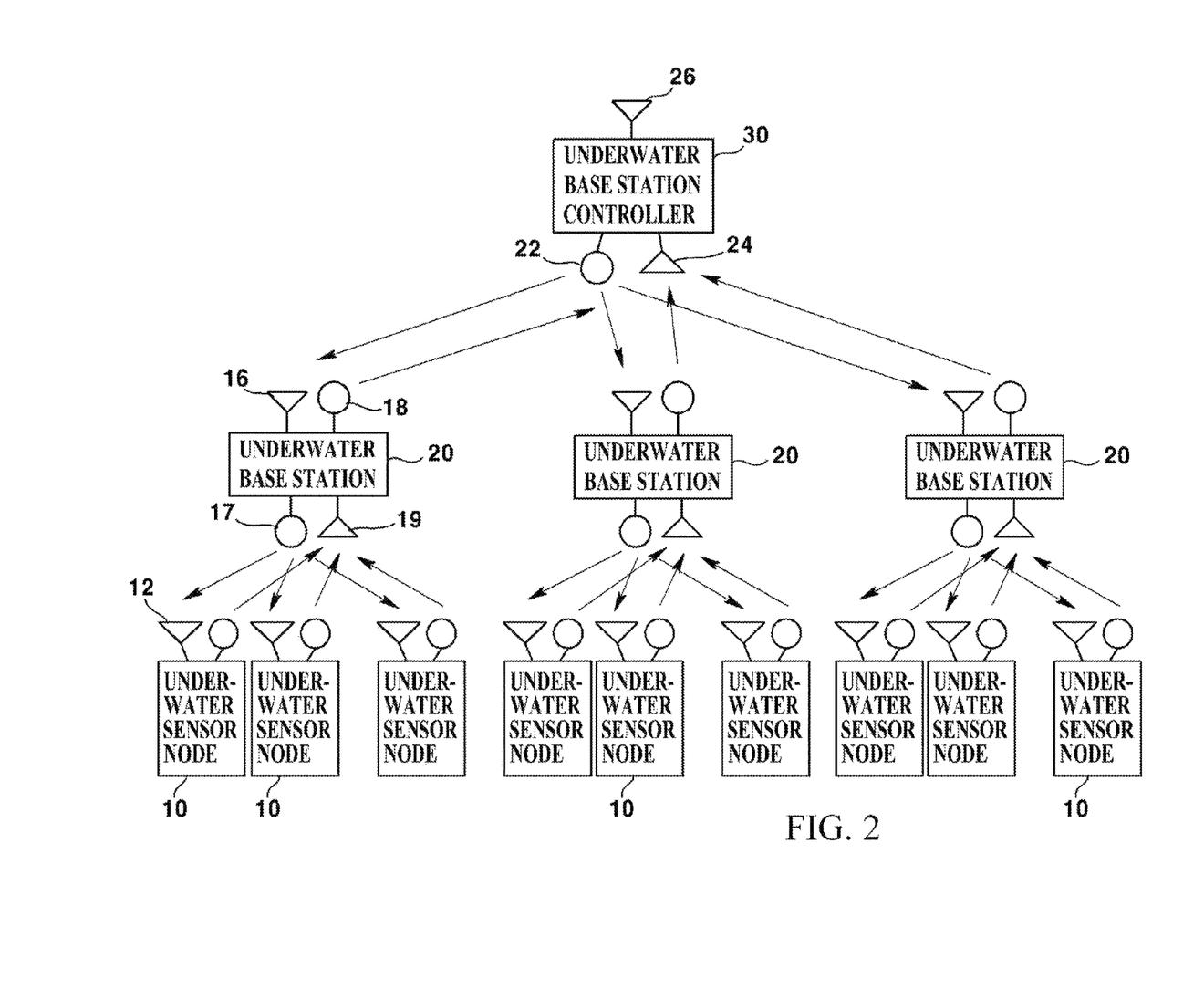
FIG. 2 is a conceptual view illustrating an entire underwater communication system according to the present invention.

FIG. 2 is a conceptual view illustrating an entire underwater communication system according to the present invention.

The most basic characteristic of the present invention is to control a plurality of underwater sensor nodes in a centralized manner. To this end, all sensor nodes installed in the underwater must be realized of 1:1 control with an underwater base station (or central node) performing a central control. This means that a direct underwater data transmission/reception necessary for a process of transmission and detection of various types of underwater information detected by the sensor node is implemented between a sensor node and an underwater base station without using other connecting means.

Likewise, a plurality of underwater base stations may be centrally controlled by an underwater base station controller. Toward this end, all the underwater base stations installed in the water must be realized of 1:1 control with the underwater base station controller performing the central control. This means that direct transmission/reception is implemented without going through other connecting means between the underwater base station controller and the underwater base station.

The underwater communication system according to the present invention may include a plurality of sensor nodes (10) installed in the underwater. The sensor node (10) may be fixedly or movably installed in an underwater environment. The sensor node (10) may be installed in as many numbers as possible in order to obtain a large quantity of underwater information. The plurality of sensor nodes (10) may be so configured as to receive control of each underwater base station (20). Thus, the plurality of sensor nodes (10) may be divided to each different group in response to the underwater base station (20) controlling the sensor nodes. That is, a plurality of sensor nodes belonging to a first group may be receive a central control from a first underwater base station, and a plurality of sensor nodes belonging to a second group may receive a central control from a second underwater base station. The sensor node (10) may include a transducer (14) for signal transmission in order to perform an underwater communication with the underwater base station (20) and a hydrophone (12) for signal reception.

The division of each sensor node configured to receive control from each underwater base station is preferably made by a distance between the sensor node and the underwater base station. That is, the sensor nodes disposed within an underwater communication scope of underwater base station may be wrapped in the same group to receive control from the underwater base station. Furthermore, the distance between the sensor node and the underwater base station may mean a sensor node existent within a signal transmissible/receivable scope in the underwater base station.

Hence, the underwater communication system according to the present invention may include an underwater base station (20) that aggregates underwater information collected by the plurality of sensor nodes (10). The underwater base station (20) may perform a function of transmitting the underwater information collected by the plurality of sensor nodes to an underwater base station controller (30). Furthermore, the underwater base station (20) may centrally manage the plurality of sensor nodes included in its signal transmissible/receivable area in the water. Thus, the underwater base station (20) is installed in a plural number, and each underwater base station (20) may manage mutually different sensor node. The underwater base station (20) may be fixedly installed in an underwater environment. The underwater base station (20) may include a transducer (17) for signal transmission in order to execute an underwater communication with the sensor node (10), and a hydrophone (19) for signal reception. Moreover, the underwater base station (20) may include a transducer (18) for signal transmission with an underwater base station controller (30), and a hydrophone (16) for signal reception.

In addition, the underwater communication system according to the present invention may include an underwater base station controller (30) in order to transmit the underwater information collected from the plurality of underwater base stations to a terrestrial network. The underwater base station controller (30) may be fixedly installed on a sea buoy installed on the sea level. Thus, the underwater base station controller (30) may include an antenna (26) in order to perform a wireless communication with a terrestrial communication network, and a transducer (22) and a hydrophone (24) for underwater communication with the underwater base station (20).

Furthermore, the underwater base station controller (30) in the underwater communication system according to the present invention may centrally manage the plurality of underwater base stations (20). At this time, the underwater base station (20) manageable by the underwater base station controller (30) may mean an underwater base station positioned within a signal transmissible/receivable scope of the underwater base station controller (30).

The underwater communication system thus configured according to the present invention may be controlled on the whole in the following manner.

The underwater communication system according to the present invention may be applied with a communication structure of hierarchically and centrally managed manner. That is, the underwater base station controller (30) may communicate with a terrestrial communication network through an antenna (26). Furthermore, the underwater base station controller (30) may also perform an underwater communication through the transducer (22) and the hydro hone (24). Furthermore, the underwater base station controller (30) may control the plurality of underwater base stations (20) by the centrally managed manner. Likewise, each of the underwater base stations (20) may perform an underwater communication with the plurality of sensors (10) by way of centrally managed manner.

Therefore, each of the plurality of sensors (10) fixedly and movably installed in an underwater environment may be configured to receive a control from any one of the underwater base stations (20). Furthermore, the underwater information detected by the plurality of sensors (10) may be collected by the underwater base station (20) controlling the sensor (10). In addition, the underwater information collected by the plurality of underwater base stations (20) may be concentrated at the underwater base station controller (30).

Through this process of the underwater information collected from the plurality of under rater sensor nodes (10) being reached at the underwater base station controller (30), data communication between the underwater base station (20) and the underwater base station controller (30), and data communication between the underwater base station (20) and the sensor node (10) are implemented, and mutually different frequency bands are used in performing each data communication. Hereinafter, a detailed explanation will be made thereto.

Figure 3:
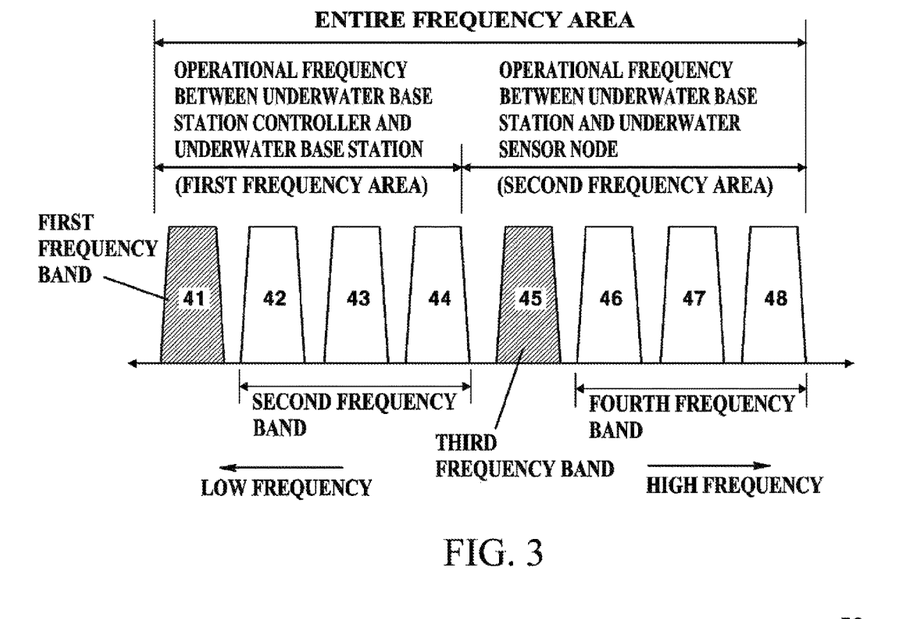
FIG. 3 is a schematic view illustrating a process of frequency division operated for efficient communication between an underwater base station controller and an underwater base station in a frequency band limited for control of underwater communication, and between an underwater base station and an underwater sensor node according to an exemplary embodiment of the present invention.

FIG. 3 is a schematic view illustrating a process of frequency division operated for efficient communication between an underwater base station controller and an underwater base station in a frequency band limited for control of underwater communication, and between an underwater base station and an underwater sensor node according to an exemplary embodiment of the present invention.

Referring to FIG. 3, the communication between the underwater base station controller and the underwater base station and the communication between the underwater base station and the underwater sensor node are performed in an underwater communication.

The underwater communication is basically implemented by ultrasonic waves. Furthermore, a useable frequency is limited in the underwater communication or a useable frequency is limited in the underwater base station controller (30). The useable frequency may be restricted by a frequency use agreement with an outside, but may be also limited by physical circumstances possessed by the underwater base station controller (30). That is, the useable frequency may be also restricted by a distance where the underwater base station controller (30) can perform the data communication.

In general, an acoustically communicationable band in underwater environment is in the range of 1 kHz~70 kHz. Although it should be apparent that the underwater communicationable band is gradually being broadened in response to technical development, the currently underwater communicationable band is restricted to a useable frequency band, and the useable frequency band is used by being in turn divided to a narrowband that satisfies a correlation bandwidth.

Thus, an entire useable frequency band may be divided to a frequency band useable for communication between an underwater base station controller and an underwater base station, and a frequency band useable for communication between an underwater base station and underwater sensor node. Here, the entire useable frequency band includes an entire frequency band use for data communication between the underwater base station controller (30) and the plurality of underwater base stations (20) and a frequency band used for data communication with the underwater sensor node (10) in all underwater base stations (20) controlled by the underwater base station controller (30).

The hereinafter useable entire frequency band will be expressed as an entire frequency band, a frequency band used in the underwater base, station controller (30) and the plurality of underwater base stations (20) will be expressed as a first frequency band area and a frequency (20) band used between the plurality of underwater base stations (20) and the plurality of sensor nodes (10) will be expressed as a second frequency band area, the expressions of which will be used hereinafter in the preparation of this specification.

The first frequency band area may be included with a frequency used when the underwater base station controller (30) and the plurality of underwater base stations (20) bi-directionally perform a data communication. The first frequency band area may be set at a lower frequency band than the second frequency band in the entire frequency band.

In general, a communication scope, i.e., a communication distance, increases as the transmitted/received frequency is low in an underwater communication environment. Therefore, a lowest frequency band (410) is used in the entire frequency band when a signal is transmitted from the underwater base stations (20) to the underwater base station controller (30) to allow all underwater base stations (20) to receive a transmission signal of the underwater base station controller (30) regardless of an installed distance.

At this time, the frequency band (41) may be shared by all underwater base stations (20) using a downlink, and may be used during signal transmission from the underwater base station controller (30) to the underwater base stations (20). Furthermore, other remaining frequency bands (42, 43, 44) in the first frequency band area except for the frequency band (41) may be allocated to each underwater base station (20) using an uplink, and may be used during signal transmission from the underwater base stations (20) to the underwater base station controller (30).

In light of the fact that attenuation of sound signal generally grows greater in the underwater environment as the frequency grows higher, lower frequencies are preferable in terms of signal transmission distance and accuracy. Such being the case, the lowest frequency band (42) in the uplink may be preferably used by an underwater base station relatively far-distanced from the underwater base station controller (30), and the highest frequency band (44) in the first frequency band area may be preferably used by an underwater base station (20) installed nearest within 1 km from the underwater base station controller (30).

Furthermore, the first frequency area may be divided to a plurality of small frequency bands (42, 43, 44) in addition to the frequency area (41) as illustrated in the drawings. At this time, the division to small frequency band may be preferably implemented as many as the number of the underwater base stations (20) manageable by the underwater base station controller (30).

Next, the second frequency area may include a frequency used when the underwater base station controller (30) and the plurality of underwater base stations (20) bi-directionally perform a data communication in the water. The second frequency area may be set at a higher frequency band than the first frequency area in the entire frequency area. The lowest frequency band (45) may be used even in the second frequency area when a signal is transmitted to all underwater sensor nodes (10) under the control of the underwater base station (20).

The frequency band (45) may be shared by all sensor nodes using the downlink. Furthermore, the remaining frequency bands (46, 47, 48) in the second frequency area except for the frequency band (45) may be allocated to each sensor node using the uplink, and may be used when a signal is transmitted from the sensor node (10) to the underwater base station (20). The lowest frequency band (46) in the uplink may be preferably used by the sensor node (10) relatively far-distanced from the underwater base station (20), and the highest frequency band (48) in the second frequency area may be preferably used by the sensor node installed nearest within 1 km from the underwater base station (20).

That is, the second frequency area may be divided to a plurality of small frequency bands (46, 47, 48) in addition to the frequency area (45), as illustrated in the drawings. At this time, the small frequency band may be preferably divided as many as the number of sensor nodes (10) manageable by the underwater base station (20). The sensor nodes manageable by the underwater base station (20) means the sensor nodes included in the data transmissible/receivable area irrespective of a distance from the underwater base station (20).

The second frequency area may be an area including an operational frequency between the underwater base station and the underwater sensor node. The underwater base station in the present invention may be formed in a plural number. Although FIG. 3 expresses the second frequency area in a singular number, an area included with the operational frequency between the underwater base station and the underwater sensor node, like the second frequency area, may be formed as many number as that of the underwater base station. That is, the underwater communication is implemented with the plurality of underwater sensor nodes using different frequency bands for each underwater base station. Furthermore, the plurality of second frequency areas may be allocated with frequencies in inverse proportion to a distance between the underwater base station controller and the underwater base station to allow the underwater base station disposed at a far distance to use a low frequency.

Hence, according to FIG. 3, the present invention may use frequencies by dividing frequencies for underwater communication between the underwater base station controller (30) and the underwater base station (20) and frequencies for underwater communication between the underwater sensor node (10) and the underwater base station (20). Furthermore, even in the underwater communication between the underwater base station controller (30) and the underwater base station (20), the frequency band for the downlink channel transmitting a signal from the underwater base station controller (30) to the underwater base station (20), and the frequency band for uplink channel transmitting a signal from the underwater base station (20) to the underwater base station controller (30) are divided. Likewise, even in the underwater communication between the underwater sensor node (10) and the underwater base station (20), the frequency band for the downlink channel transmitting a signal from the underwater base station (20) to the underwater sensor node (10), and the frequency band for uplink channel transmitting a signal from the underwater sensor node (10) to the underwater base station (20) are divided. The frequency division as described above may minimize the signal interference between frequencies in order to satisfy the correlation bandwidth.

Figure 4:
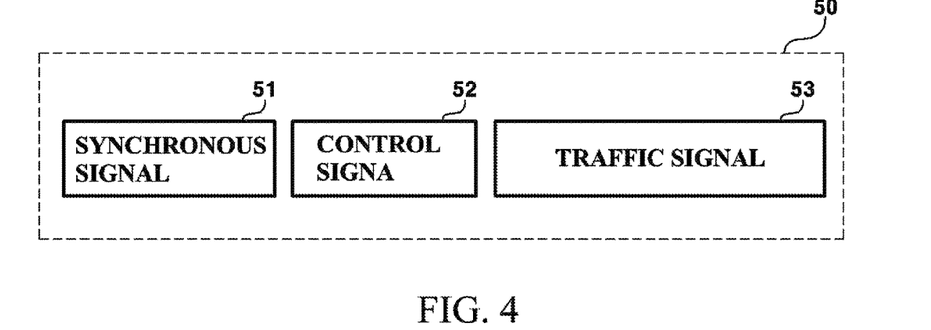
FIG. 4 is a schematic block diagram illustrating a frame structure of data transmission protocol of downlink transmitting from an underwater base station controller to an underwater base station in an underwater communication system according to an exemplary embodiment of the present invention.

Next, FIG. 4 is a schematic block diagram illustrating a frame structure of data transmission protocol of downlink transmitting from an underwater base station controller (30) to an underwater base station (20) in air underwater communication system according to an exemplary embodiment of the present invention.

A frame structure (50) of underwater communication protocol according to the present invention may be configured by including a synchronous signal (51), a control signal (52) and a traffic signal (53). Although FIG. 4 illustrates a frame structure of downlink transmitting from the underwater base station controller (30) to the underwater base station (20), the data transmission protocol among all devices in the present invention has the same frame structure as above.

Only difference is that contents of data on the synchronous signal, the control signal and the traffic signal are different. The synchronous signal (51) included in the frame structure of downlink transmitting from the underwater base station controller (30) to the underwater base station (20) may be received by all underwater base stations (20) under control of the underwater base station controller (30) to allow realizing a time synchronization between the underwater base stations (20). Furthermore, the synchronous signal (51) may be used to detect ID information, where data transmission time of each underwater base station (20) is allocated.

The control signal (52) included in the frame structure of downlink transmitting from the underwater base station controller (30) to the underwater base stations (20) may include all information necessary for detecting the traffic signal (53), i.e., information on modulation method of traffic signal. Therefore, the underwater base stations (20) may receive a signal to be transmitted from the underwater base station controller (30), may be allocated with its data transmission time in response to the synchronous signal (51) and may detect a traffic signal (53) using the control signal (52).

Likewise, the underwater base station controller (30) included in the frame structure of uplink transmitting from the underwater base station (20) to the underwater base station controller (20) may have a structure as illustrated in FIG. 4. That is, the control signal (52) may receive the synchronous signal included in the frame structure of uplink transmitting from the underwater base station (20) to the underwater base station controller (30), may be used for frame time synchronization and may be used to detect ID information of the underwater base station (20).

The control signal included in the frame structure of uplink transmitting from the underwater base station (20) to the underwater base station controller (30) may include all information necessary for detecting the traffic signal, i.e., information on modulation method of traffic signal. Therefore, the underwater base station controller (30) may receive a signal transmitted from the underwater base station (20), and may ascertain the data transmission time of each underwater base station (20) in response to the synchronous signal.

When time synchronization is realized between the underwater base station (20) and the underwater base station controller (30) through the abovementioned processes, a control process that periodically transmits the underwater information from the underwater base station (20) to the underwater base station controller (30) may be implemented in response to the synchronized transmission time.

Furthermore, the frame structure of downlink transmitting from the underwater base station (20) to the underwater sensor node (30) may have a structure as illustrated in FIG. 4.

That is, all the sensor nodes (10) under the control of underwater base station may receive the synchronous signal included in the frame structure of downlink transmitting from the underwater base station (20) to the underwater base station controller (30) where the control signal is used to time synchronization of each sensor node. Furthermore, the synchronous signal is used to detect ID information of the underwater base station (20). Each sensor node (10) may be allocated with its own data transmission time.

The control signal included in the frame structure of uplink transmitting from the underwater base station (20) to the underwater sensor node (10) may include all information necessary for detecting the traffic signal, i.e., information on modulation method of traffic signal. Therefore, the sensor node (10) may ascertain its own data transmission time in response to the synchronous signal transmitted by the underwater base station (20) and detect the traffic signal using the control signal.

Furthermore, the frame structure of uplink transmitting from the underwater sensor node (10) to the underwater base station (20) may have a structure as illustrated in FIG. 4. That is, the underwater base station (20) may receive the synchronous signal included in the frame structure of uplink transmitting from the underwater sensor node (10) to the underwater base station (20) where the synchronous signal is used for the frame time synchronization and for detection of ID information on the underwater sensor node (10).

The control signal included in the frame structure of uplink transmitting from the underwater sensor node (10) to the underwater base station (20) may include all information necessary for detecting the traffic signal, i.e., information on modulation method of traffic signal. Therefore, the underwater base station (20) may ascertain the ID information of each sensor node in response to the synchronous signal transmitted from the underwater sensor node (10).

When time synchronization is realized between the underwater base station (20) and the underwater sensor node (10) through the abovementioned processes, a control process that periodically transmits the underwater information from the underwater sensor node (10) to the underwater base station controller (30) may be implemented in response to the synchronized transmission time.

Thus, according to FIG. 4, the present invention may transmit a signal to the underwater base station (20) using a frequency band (41) designated with the underwater base station controller (30). At this time, the underwater base station (20) may first receive the synchronous signal (51) and the control signal (52) and then perform a time and frequency synchronization process using the synchronous signal. Furthermore, the underwater base station (20) may transmit the synchronous signal and the control signal to the underwater base station controller (30) in a designated frequency band allocated to the uplink channel.

Through the abovementioned processes, a mutual ID ascertaining process is realized between the underwater base station controller (30) and the underwater base station (20) to become of a state where data transmissible/receivable channel is opened, whereby transmission/reception of traffic signal between the underwater base station controller (30) and the underwater base station (20) may be realized.

Next, the underwater base station (20) may transmit a synchronous signal and a control signal included with an underwater base station ID to the underwater sensor node (10). The underwater sensor node (10) may receive the synchronous signal and the control signal, and may implement a time and frequency synchronization process using the synchronous signal. Furthermore, the underwater sensor node (10) may obtain the ID information of the underwater base station (20) and may transmit the synchronous signal and the control signal to the underwater base station (20) through the uplink channel.

Through the abovementioned processes, a mutual ID ascertaining process is realized between the underwater sensor node (10) and the underwater base station (20) to become of a state where data transmissible/receivable channel is opened, whereby transmission/reception of traffic signal between the underwater base station (20) and the underwater sensor node (10) may be realized.

The underwater communication protocol used in the present invention may have the standard based-IEEE802.15.4 super frame structure. That is, the underwater communication between the underwater base station controller (30) and the underwater base station (20) according to the present invention may realize the data transmission/reception in response to the transmission time allocated to the underwater base station (20) under the control of the underwater base station controller (30). Furthermore, the underwater communication between the underwater sensor node (10) and the underwater base station (20) according to the present invention may realize the data transmission/reception in response to the transmission time allocated to the underwater sensor node (10) under the control of the underwater base station (20).

Furthermore, the underwater communication performed among the devices according to the present invention nay be realized by using various multiple access methods (frequency-division multiple access method, time division multiple access method, code division multi-connection method, carrier sensing multiple connection method, etc.), and the well-known multiple access methods are omitted of further elaborations here from.

Figure 5:
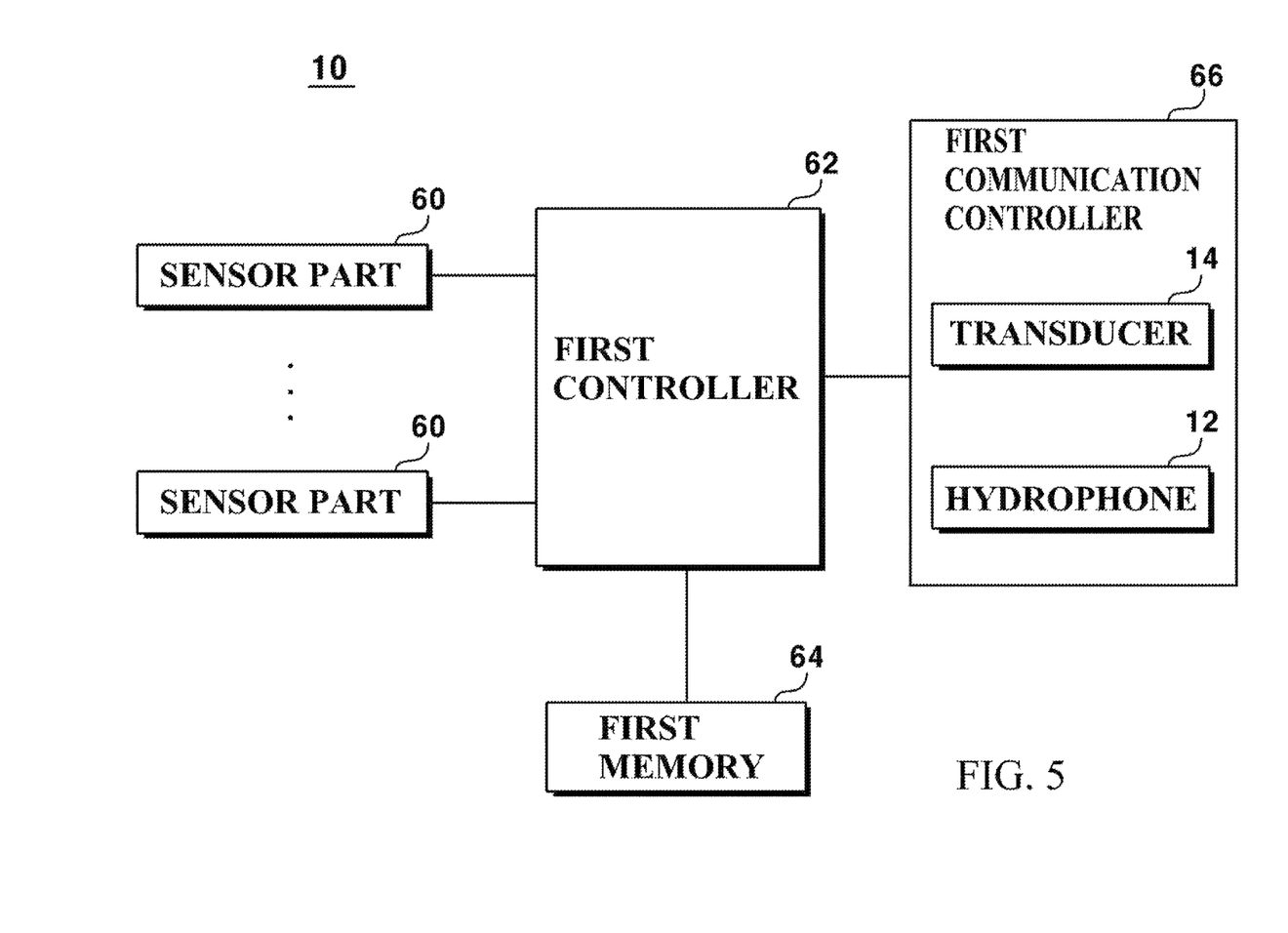
FIG. 5 is a schematic block diagram illustrating an underwater sensor node applied to an underwater communication system according to an exemplary embodiment of the present invention.

Next, FIG. 5 is a schematic block diagram illustrating an underwater sensor node applied to an underwater communication system according to an exemplary embodiment of the present invention.

Figure 6:
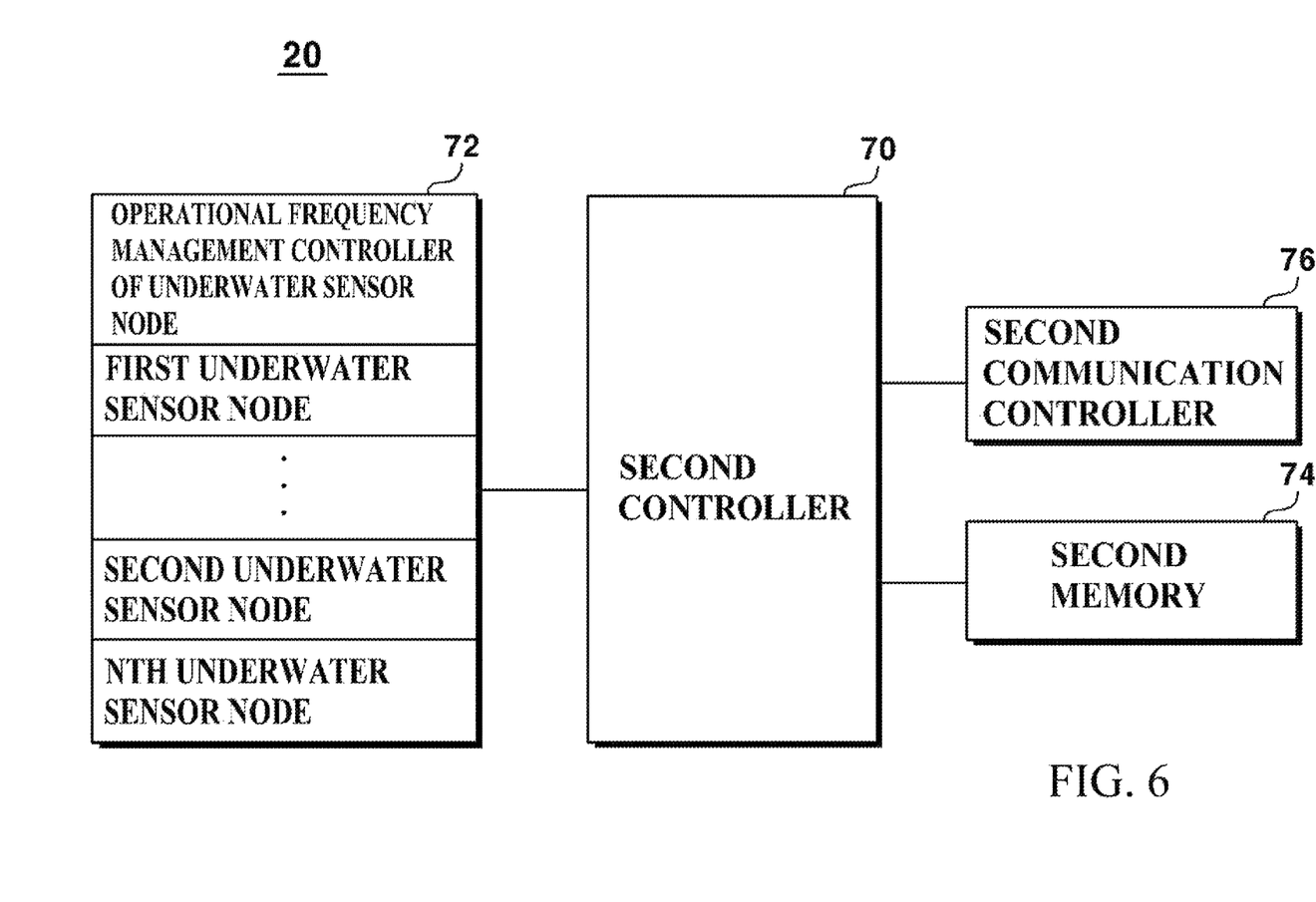
FIG. 6 is a schematic block diagram illustrating an underwater base station applied to an underwater communication system according to an exemplary embodiment of the present invention.

FIG. 6 is a schematic block diagram illustrating an underwater base station applied to an underwater communication system according to an exemplary embodiment of the present invention.

Figure 7:
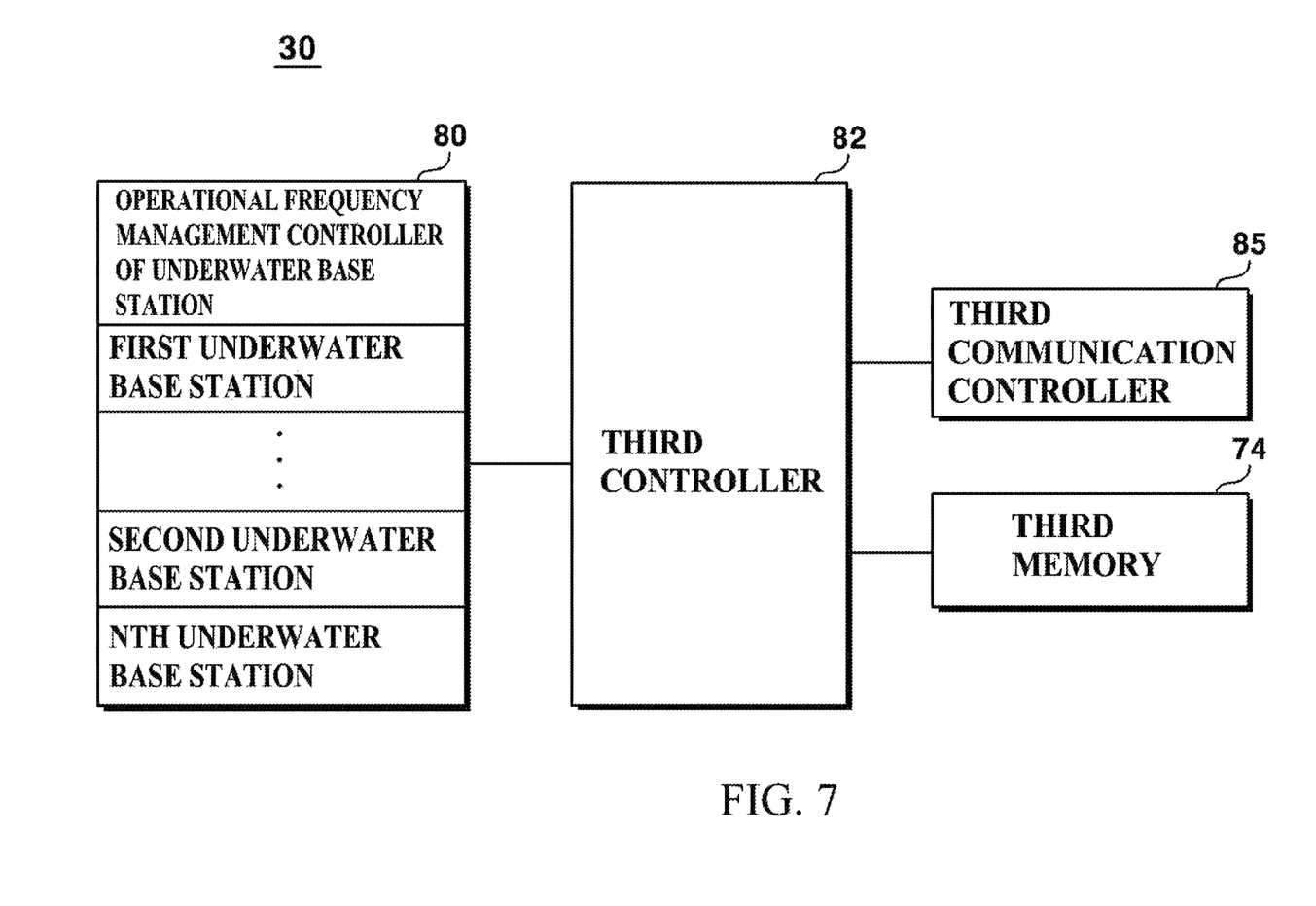
FIG. 7 is a schematic block illustrating an underwater base station controller applied to an underwater communication system according to an exemplary embodiment of the present invention.

FIG. 7 is a schematic block illustrating an underwater base station controller applied to an underwater communication system according to an exemplary embodiment of the present invention.

Referring to FIG. 5, the sensor node (10) may include one or more sensor parts (60) for collecting data necessary for underwater, and a first communication controller (66) for modulating the data sensed by each sensor part (60) and for transmitting the data to the underwater base station (20) by converting the modulated data to an ultrasonic wave, or demodulating by receiving the ultrasonic wave transmitted from the underwater base station (20). The fast communication controller (66) may include a transducer (14) for transmitting a signal and a hydrophone (12) for receiving the signal. The sensor node (10) may further include a first controller (62) for controlling the sensor part (60) and the first communication controller (66) and performing various controls required by the sensor node and other devices. Furthermore, the sensor node (10) may be configured by including a first memory (64) for storing various data and algorithms required an entire operational control of the sensor node (10) and storing the underwater information detected by the sensor part (60).

The plurality of sensor parts (60) may sense various types of underwater information including water temperature catering to its purpose, dissolved oxygen and seismic wave, and output the sensed data to the first controller (62). The sensor part (60) may be a digital sensor, but may be configured to output a digital signal by converting a data sensed in an analogue signal to a digital signal. In this case, the sensor part (60) may include an ADC (Analogue/Digital Converter) converting an analogue signal to a digital signal. Furthermore, a data signal-processed in all configurations in the present invention is basically a digital signal.

The first communication controller (66) may perform a function of transmitting and/or receiving a data using the ultrasonic wave in the water. That is, the transducer (14) may transmit the underwater information detected by the sensor part (60) to the underwater base station (20) by converting the underwater information to an ultrasonic signal.

Furthermore, the hydrophone (12) may receive the ultrasonic wave transmitted from the underwater base station (20) to the first controller (62).

The illustrated sensor node (10) may receive the underwater information transmitted by the underwater base station (20) through the hydrophone (12). The hydrophone (12) may be realized with a frequency setting by a frequency band (45) set at the downlink in order to enable the reception of signal transmitted from the underwater base station (20). Furthermore, the transducer (14) may be set in a particular frequency included in the frequency band allocated to itself and transmit the information to be transmitted to the underwater base station (20) on the set particular frequency.

However, in an initial setting process where the frequency setting of each sensor node (10) is not realized, there is a need to set the frequency of the transducer (14) at the sensor node (10) using the frequency band of downlink. This is to transmit/receive data necessary until a frequency allocation between the underwater base station (20) and the sensor node (10) is realized. Thus, the frequency setting for the transducer (14) and the hydrophone (12) included in the first communication controller (66) of the sensor node (10) may be preferably configured to be variably controlled.

The first controller (62) may perform a control of storing various types of underwater information detected by the sensor part (60) in the first memory (64), or may perform a control of transmitting/receiving the underwater information that is realized through the first communication controller (66). Furthermore, the first controller (62) may perform a control for distance detection between the sensor node (10) and the underwater base station (20).

Toward this end, the first controller (62) may include a configuration of receiving a reference signal transmitted for distance detection by the underwater base station (20) through the hydrophone (12), and detecting the size of received power. The power intensity of the received signal may be detectable through a simple computing process by directly detecting a power of the received signal, or detecting a current or a voltage of the power. The detection configuration of size of received power may be applicable using various technologies including a power detector that is well known in the art. Furthermore, the current size may be simply detected by installation of a current detecting resistor at a receiving part. These detecting methods are well-known art and no further extended explanation will be omitted. Furthermore, the distance estimation using the power intensity of the detected received signal may be possible by using the power intensity versus distance value pre-stored in the first memory (64).

Furthermore, as another method to detect a distance, the first controller (62) may detect a delayed time consumed until reaching the sensor node (10) after a signal is transmitted from the underwater base station (20). The detection of delayed time may be made to be possible by a distance between time information in which a signal transmission is started from the underwater base station (20) and time information in which the signal has reached, for example. Furthermore, in order to detect the arrival time information, it is preferable that a time counting function be included in the first controller (62). Furthermore, the distance estimation using the detected delayed time may be made possible by using a delayed time versus distance value pre-stored in the first memory (64).

The first memory (64) may be used for storage of various types of information required and detected by the sensor node (10). The detected information of the sensor part (60) may be also stored in the first memory (64). Particularly, the first memory (64) may be stored with various types of information to be used for distance detection when the distance detection is directly performed by the sensor node (10). For example, the first memory (64) may store information to determine the intensity of received power, information to detect the delayed time, information to determine a distance between the underwater base station (20) and the sensor node (10) using the intensity of received power and information of frequency band-communicationable in the water in response to the estimated distance information. The first controller (62) can perform the processes of distance estimation, request of particular frequency band and the like, using the various types of information stored in the first memory (64).

The reason of requiring the distance detection between the underwater base station (20) and the sensor node (10) is to perform a frequency band setting in association with the distance. That is, because the transmissible/receivable frequency bands are different in response to the distance, there is a need for all the underwater sensor nodes (10) to be set with frequency bands adequate to perform an efficient data transmission/reception with the underwater base stations (20). Thus, after the distance detection is completed, a frequency setting process adequate to each sensor node (10) is realized, and after the frequency setting adequate to each sensor node (10) is completed, the data communication can be implemented at a time allocated to each sensor node.

Referring to FIG. 6, the underwater base station (20) may include a second communication controller (76) including a transducer (17) and a hydrophone (19) to perform the transmission/reception of underwater signals with the sensor node (10) using an ultrasonic wave. Furthermore, the second communication controller (76) may include a transducer (18) and a hydrophone (16) in order to perform the transmission/reception of underwater signals with the underwater base station controller (30). Furthermore, the underwater base station (20) may include a second controller (70) to perform the control of the communication controller and to control the information storage, and a second memory (74) to store various types of information necessary for operation of the underwater base station (20).

Still furthermore, the underwater base station (20) must divide useable frequency hands and allocate the useable frequency bands to a plurality of sensor nodes. Therefore, the underwater base station (20) may allow the second controller (70) to perform the control of dividing the frequency bands as many as the number of sensor nodes included in its data communication area. Furthermore, the underwater base station (20) may include an operational frequency management controller (72) of underwater sensor node storing the divided frequency band information, identifying information for information of each sensor node, and various types of control information and underwater information in response to each sensor node. The operational frequency management controller (72) of underwater sensor node may store underwater-communicationable frequency band information allocable in response to the estimated distance information. That is, the operational frequency management controller (72) of underwater sensor node may estimate a distance between the underwater base station (20) and the sensor node (10), and control the selection of particular frequency band allocable to an arbitrary sensor node. Furthermore, the operational frequency management controller (72) of underwater sensor node may include control information for frequency division, and store information on the divided frequency band and information in association with the sensor node set to the divided frequency band. Still furthermore, the operational frequency management controller (72) of underwater sensor node may store underwater information collected from the sensor nodes.

The present invention may be so configured as to use and divide the operational frequency between the underwater base station (20) and the underwater sensor node (10) to smaller frequency bands, as illustrated in FIG. 3. Therefore, the second controller (70) may control the frequency division by dividing the useable frequency band to narrowband frequency, and may so control as to allow realizing an efficient transmission/reception by hereafter allocating each sensor node with different frequency during transmission/reception of signal with an arbitrary sensor node (10).

Furthermore, the transducer (17) of the second communication controller (76) may allow frequency setting to a lowest frequency (45) at the allocated frequency band, because signal transmission to all sensor nodes (10) under the control of underwater base station (20) must be enabled. Furthermore, the hydrophone (19) inside the second communication controller (76) may be such that the frequency setting is variable in response to an arbitrary sensor node where the data communication is to be performed, Which is to realize frequency matching with the sensor node to be performed with the data communication. However, in the initial setting process where the frequency is not set at each sensor node (10), the hydrophone (19) may be set to a lowest frequency band in the frequency allocated to the underwater base station. This is to enable reception of signal transmitted from the sensor nodes existent at all distances, because, this is prior to the sensor node (10) being realized with the frequency setting.

To this end, the second communication controller (76) may control the frequency division, and control a series of processes in which frequency of hydrophone (19) is variably set to a frequency adequate to data transmission time. The frequency division operation of frequency divider may be preferably performed in a digital manner.

Although the present invention can also implement a case where a distance detection process is performed by the first controller (62) of the sensor node (10), the present invention can also implement a case where the distance detection process is performed by the second controller (70) of the underwater base station (20).

Therefore, the second controller (70) may include a configuration of receiving a reference signal transmitted by the sensor node (10) for distance detection by the sensor node (10) and detecting the size of received power. The power intensity of the received signal may be detectable through a simple computing process by directly detecting a power of the received signal, or detecting a current or a voltage of the power. The detection configuration of size of received power may be applicable using various technologies including a power detector that is well known in the art. It should be apparent that the size detection of received power may be possible by the sensor node performing the size detection and receiving the detected information only. Furthermore, the current size may be simply detected by installation of a current detecting resistor. Likewise, the detection of current size may be performed by the sensor node, and reception of the detected current size only may be also possible. These detecting methods are well-known art and no further extended explanation will be omitted. Furthermore, the distance estimation using the power intensity of the detected received signal may be possible by using the power intensity versus distance value pre-stored in the second memory (74).

Furthermore, as another method to detect a distance, the second controller (70) may use a distance detection method by detecting a delayed time consumed until reaching the underwater base station (20) after a signal is transmitted from the sensor node (10). The detection of delayed time may be made to be possible by comparing a difference between time information in which a signal transmission is started from the sensor node (10) and time information in which the signal has reached the underwater base station (20), for example. Furthermore, in order to detect the arrival time information, it is preferable that a time counting function be included in the second controller (70). Furthermore, the distance estimation using the detected delayed time may be made possible by using a delayed time versus distance value pre-stored in the second memory (74).

The second memory (74) may be used for storage of various types of information required and detected by the underwater base station (20). Particularly, the second memory (74) may be stored with various types of information to be used for distance detection when the distance detection is performed by the underwater base station (20). For example, the second memory (74) may store information to determine a distance between the underwater base station (20) and the sensor node (10) using the intensity of received power provided from the sensor node (10) and the delayed time.

Referring to FIG. 7, the underwater base station controller (30) may include a third communication controller (86) including a transducer (22) and a hydrophone (24) to perform the transmission/reception of underwater signals with the underwater base station (20) using an ultrasonic wave. Furthermore, the third communication controller (86) may include a configuration to perform a wireless communication with a terrestrial communication network. Furthermore, the underwater base station controller (30) may include a third controller (82) to perform the control of the third communication controller (86) and to control the information storage, and a third memory (84) to store various types of information necessary for operation of the underwater base station controller (30).

Still furthermore, the underwater base station controller (30) must divide useable frequency bands and allocate the useable frequency bands to a plurality of underwater base stations (20). Therefore, the third controller (82) may perform the control of dividing the frequency band as many as the number of underwater base station (20) included in its data communication area.

Furthermore, the underwater base station controller (30) may include an operational frequency management controller (80) of underwater base station storing the divided frequency band information, identifying information for information of each underwater base station, and various types of control information and underwater information in response to each underwater base station.

The operational frequency management controller (80) of underwater base station may store underwater-communicationable frequency band information allocable in response to the estimated distance information. That is, the operational frequency management controller (80) of underwater base station may estimate a distance between the underwater base station (20) and the underwater base station controller (30), and control the selection of particular frequency band allocable to each underwater base station. Furthermore, the operational frequency management controller (802) of underwater base station may include control information for frequency division, and store information on the divided frequency band and information in association with the underwater base station set to the divided frequency band. Still furthermore, the operational frequency management controller (80) of underwater base station may store underwater information collected from the underwater base station controllers.

The present invention may be so configured as to use and divide the operational frequency between the underwater base station (20) and the underwater base station controller (30) to smaller frequency bands, as illustrated in FIG. 3. Therefore, the third controller (82) may control the frequency division by dividing the useable frequency band to narrowband frequency, and may so control as to allow realizing an efficient transmission/reception by hereinafter allocating each underwater base station with different frequency during transmission/reception of signal with an arbitrary underwater base station (20).

Furthermore, the transducer (22) of the third communication controller (86) may allow frequency setting to a lowest frequency (41) at the allocated frequency band, because signal transmission to all underwater base station (20) under the control of underwater base station controller (30) must be enabled. Furthermore, the hydrophone (24) inside the third communication controller (86) may be such that the frequency setting is variable in response to an arbitrary underwater base station (20) where the data communication is to be performed, which is to realize frequency matching with the underwater base station (20) to be performed with the data communication.

However, in the initial setting process where the frequency is not set at each underwater base station (20), the hydrophone (24) may be set to a lowest frequency band in the frequency allocated to the underwater base station controller (30). This is to enable reception of signal transmitted from the underwater base station (20) existent at all distances, because, this is prior to the underwater base station (20) being realized with the frequency setting.

To this end, the third communication controller (86) may control the frequency division, and control a series of processes in which frequency of hydrophone (24) is variably set to a frequency adequate to data transmission time. The frequency division operation may be preferably performed in a digital manner.

Furthermore, in order to allow the divided frequency to be allocated to each underwater base station according to the present invention, a distance detection is required between the underwater base station (20) and the underwater base station controller (30), and this process may be implemented within the underwater base station (20). Furthermore, the underwater base station controller (30) may also perform this process.

Therefore, the third controller (82) may include a configuration of receiving a reference signal transmitted by the underwater base station (20) for distance detection by the underwater base station (20) and detecting the size of received power. The power intensity of the received signal may be detectable through a simple computing process by directly detecting a power of the received signal, or detecting a current or a voltage of the power. The detection configuration of size of received power may be applicable using various technologies including a power detector that is well known in the art. It should be apparent that the size detection of received power may be possible by the sensor node performing the size detection and receiving the detected information only. Furthermore, the current size may be simply detected by installation of a current detecting resistor. Likewise, the detection of current size may be performed by the sensor node, and reception of the detected current size only may be also possible. These detecting methods are well-known art and no further extended explanation will be omitted. Furthermore, in distance estimation using the power intensity of the detected received signal may be possible by using the power intensity versus distance value pre-stored in the second memory (74).

Furthermore, as another method to detect a distance, the third controller (82) may use a distance detection method by detecting a delayed time consumed until reaching the underwater base station controller (30) after a signal is transmitted from the underwater base station (20). The detection of delayed time may be made to be possible by comparing a difference between time information in which a signal transmission is started from the underwater base station (20) and time information in which the signal has reached the underwater base station controller (30), for example. Furthermore, in order to detect the arrival time information, it is preferable that a time counting function be included in the third controller (82). Furthermore, the distance estimation using the detected delayed time may be made possible by using a delayed time versus distance value pre-stored in the third memory (84). Furthermore, the third memory (84) may be used for storage of various types of information required and detected by the underwater base station controller (30). Particularly, the third memory (84) may be stored with various types of information to be used for distance detection when the distance detection is performed by the underwater base station controller (30). For example, the third memory (84) may store information to determine a distance between the underwater base station (20) and the underwater base station controller (30) using the intensity of received power provided from the underwater base station (20) and the delayed time.

The underwater communication system according to the abovementioned configurations can divide an entire frequency band useable by the underwater base station controller (30) to an operational frequency between the underwater base station and the underwater base station controller, and an operational frequency between the underwater base station and the underwater sensor node.

At this time, the frequency division may be preferably divided within a correlation bandwidth-allowable scope by using the number of underwater base stations (20) managed by the underwater base station controller (30) and the number of underwater sensor nodes (10) managed by the underwater base station (20).

Furthermore, when the signal is transmitted from the underwater base station controller (30) to the underwater base station (20), a lowest frequency (41) is used among the frequencies in order to enable the signal reception of all underwater base stations (20). Furthermore, the frequency allocation in response to distance may be controlled in such a manner that the underwater base station (20) disposed at a farthest distance is allocated with the next low frequency (42) about the underwater base station controller (30).

After the frequency allocation to each underwater base station (20) is realized as mentioned above, the underwater base station controller (30) may manage the plurality of underwater base stations (20) in a centralized manageable manner, and when a signal is transmitted from the underwater base station controller (30) to the underwater base station (20), the frequency allocation may be implemented by using the first frequency (41), and when a signal is transmitted from each underwater base station (20) to the underwater base station controller (30), the frequency allocation may be implemented by using the frequency allocated thereto.

Furthermore, when a signal is transmitted from the underwater base station (20) to the underwater sensor node (10), a lowest frequency (45) may be used among the frequencies allocated to enable the signal reception of all underwater sensor nodes (10). Furthermore, the frequency allocation in response to distance may be controlled in such a manner that the underwater sensor node (10) disposed at a farthest distance is allocated with the next low frequency (42) about the underwater base station (20).

After the frequency allocation is realized to each underwater sensor node (10) as explained above, the underwater base station (20) may manage the plurality of underwater sensor nodes (20) in a centralized manageable manner, and when a signal is transmitted from the underwater base station (20) to the plurality of underwater sensor nodes (120), the frequency allocation may be implemented by using the frequency (45), and when a signal is transmitted from each underwater sensor node (10) to the underwater base station (20), the frequency allocation may be implemented by using the frequency allocated thereto.

Thus, the foregoing detailed explanation may be considered not as being of limited interpretation but as being exemplary in all respects. The scope of the present invention may be determined by rational interpretation of attached claims, and all changes within the equivalent scope of the present invention are included within the scope of the present invention.

DESCRIPTION OF REFERENCE NUMERALS

10: underwater sensor node
20: underwater base station
30: underwater base station controller
12, 16, 19, 24: hydrophones
14, 18, 19, 22: transducers

INDUSTRIAL APPLICABILITY

The present invention may be particularly applicable to an underwater communication system in hierarchical structure of centralized management.

The invention claimed is:
1. An underwater communication system, the system comprising:
a plurality of sensor nodes installed in an underwater environment;
a plurality of underwater base stations each centrally managing a group of the plurality of sensor nodes in order to aggregate underwater information detected by the plurality of sensor nodes; and
an underwater base station controller centrally managing the plurality of underwater base stations installed in the underwater environment,
wherein each of said plurality of underwater base stations is configured to estimate a distance between the underwater base station and each underwater sensor node managed thereby, and control allocation and assignment of a particular frequency band selection to each underwater sensor node in response to the estimated distance,
wherein each of said plurality of underwater base stations is configured to allocate and assign a first frequency area for underwater communication between the underwater base station and underwater base station controller, and a second frequency area for underwater communication between the underwater base station and the plurality of underwater sensor nodes, wherein the first frequency area is divided to a first frequency band to be used when a signal is transmitted from the underwater base station controller to the underwater base station, and a second frequency band to be used when a signal is transmitted from the underwater base station to the underwater base station controller; and wherein the second frequency area is divided to a third frequency band used when a signal is transmitted from the underwater base station to the underwater sensor node, and a fourth frequency band used when a signal is transmitted from the underwater sensor node to the underwater base station.

2. The underwater communication system of claim 1, wherein each one of the plurality of underwater base stations manages a different group of said plurality of sensor nodes.

3. The underwater communication system of claim 1, wherein the first frequency band includes a lowest frequency in all operable frequency bands included in the first frequency area and the second frequency area.

4. The underwater communication system of claim 1, wherein the second frequency band is divided to a number of narrow band frequencies equal to the number of underwater base stations, and to different frequency is allocated to each underwater base station.

5. The underwater communication system of claim 1, wherein the third frequency band includes a lowest frequency in an operational frequency included in the second frequency area.

6. The underwater communication system of claim 1, wherein the fourth frequency band is divided to a number of narrowband frequencies equal to the number of underwater sensor nodes under management of the underwater base station, and is allocated with another frequency to each underwater sensor node.

7. The underwater communication system of claim 1, wherein the underwater base station controller is configured to estimate a distance between the underwater base controller and each of said plurality of underwater base stations, and control allocation and assignment of a particular frequency band selection to each underwater base station in response to the estimated distance.

8. An underwater communication system, the system comprising:
   a plurality of sensor nodes installed in an underwater environment;
   a plurality of underwater base stations each centrally managing a group of the plurality of sensor nodes in order to aggregate underwater information detected by the plurality of sensor nodes; and
   an underwater base station controller centrally managing the plurality of underwater base stations installed in the underwater environment,
   wherein each of said plurality of underwater base stations is configured to estimate a distance between the underwater base station and each underwater sensor node managed thereby, and control allocation and assignment of a particular frequency band selection to each underwater sensor node in response to the estimated distance;
   wherein each of said plurality of underwater base stations is configured to allocate and assign a first frequency area for underwater communication between the underwater base station and underwater base station controller, and a second frequency area for underwater communication between the underwater base station and the plurality of underwater sensor nodes, wherein the first frequency area is divided to a first frequency band to be used when a signal is transmitted from the underwater base station controller to the underwater base station, and a second frequency band to be used when a signal is transmitted from the underwater base station to the underwater base station controller;
   wherein each of the plurality of underwater base stations includes a management controller for managing an operational frequency of a group of underwater sensor nodes, a base station controller for controlling an entire underwater base station, a communication controller for communication between the underwater sensor node and the underwater base station controller, and a memory for storing data necessary for frequency management of the underwater sensor node, and
   the underwater base station controller includes a management controller for managing operational frequency of the plurality of underwater base stations, a base station controller for controlling an entire underwater base station controller, a communication controller for communication between the plurality of underwater base stations, and a memory for storing data necessary for frequency management of the underwater base station, and wherein the frequency management of the first frequency area is realized under management of the underwater base station controller, and the frequency management of the second frequency area is realized by management of the plurality of underwater base stations.

9. An underwater communication system, comprising:
   a plurality of sensor nodes installed in an underwater environment and arranged in a plurality of groups to detect underwater information;
   a plurality of underwater base stations installed in the underwater environment and in operative communication with one of said groups of sensor nodes and configured to centrally manage said group of sensor nodes in order to aggregate said underwater information detected thereby; and
   an underwater base station controller in operative communication with said plurality of underwater base stations and configured to centrally manage the plurality of underwater base stations,
   wherein each of said plurality of underwater base stations is configured to estimate distance to each underwater sensor node managed thereby and assign a particular frequency band for communication therewith in response to the estimated distance,
   wherein each of said plurality of underwater base stations is configured to allocate and assign a first frequency area for underwater communication between the underwater base station and underwater base station controller and a second frequency area for underwater communication between the underwater base station and the plurality of underwater sensor nodes; and
   wherein the second frequency area is divided to a third frequency band used when a signal is transmitted from the underwater base station to the underwater sensor node, and a fourth frequency band used when a signal is transmitted from the underwater sensor node to the underwater base station.

10. The underwater communication system of claim 9, wherein each one of the plurality of underwater base stations manages a different group of said plurality of sensor nodes.

11. The underwater communication system of claim 9, wherein the first frequency band includes a lowest frequency in all operable frequency bands included the first frequency area and the second frequency area.

12. The underwater communication system of claim 9, wherein the third frequency band includes a lowest frequency in an operational frequency included in the second frequency area.

13. The underwater communication system of claim 9, wherein the fourth frequency band is divided to a number of narrowband frequencies equal to the number of underwater sensor nodes under management of the underwater base station, and is allocated with another frequency to each underwater sensor node.

14. An underwater communication system, comprising:
- a plurality of sensor nodes installed in an underwater environment and arranged in a plurality of groups to detect underwater information;
- a plurality of underwater base stations installed in the underwater environment and in operative communication with one of said groups of sensor nodes and configured to centrally manage said group of sensor nodes in order to aggregate said underwater information detected thereby; and
- an underwater base station controller in operative communication with said plurality of underwater base stations and configured to centrally manage the plurality of underwater base stations,
  wherein each of said plurality of underwater base stations is configured to estimate distance to each underwater sensor node managed thereby and assign a particular frequency band for communication therewith in response to the estimated distance;
  wherein each of said plurality of underwater base stations is configured to allocate and assign a first frequency area for underwater communication between the underwater base station and underwater base station controller and a second frequency area for underwater communication between the underwater base station and the plurality of underwater sensor nodes;
  wherein the first frequency area is divided to a first frequency band to be used when a signal is transmitted from the underwater base station controller to the underwater base station, and a second frequency band to be used when a signal is transmitted from the underwater base station to the underwater base station controller; and
  wherein the second frequency band is divided to a number of narrow band frequencies equal to the number of underwater base stations, and a different frequency is allocated to each underwater base station.

* * * * *

UNITED STATES PATENT AND TRADEMARK OFFICE
CERTIFICATE OF CORRECTION

PATENT NO. : 10,476,605 B2
APPLICATION NO. : 16/065425
DATED : November 12, 2019
INVENTOR(S) : Hak-Lim Ko, Yong-Kap Cho and Tae-Ho Im It is certified that error appears in the above-identified patent and that said Letters Patent is hereby corrected as shown below:

On the Title Page

Item (54) and in the Specification Column 1, Lines 1-2, the title was listed as "UNDERWATER COMMUNICATION METHOD", it should be "Underwater Communication System".

Signed and Sealed this
Seventeenth Day of May, 2022

Katherine Kelly Vidal
*Director of the United States Patent and Trademark Office*